June 6, 1950   J. McLAUGHLIN   2,510,751
AUGER BIT HEAD
Filed April 8, 1944   2 Sheets-Sheet 1
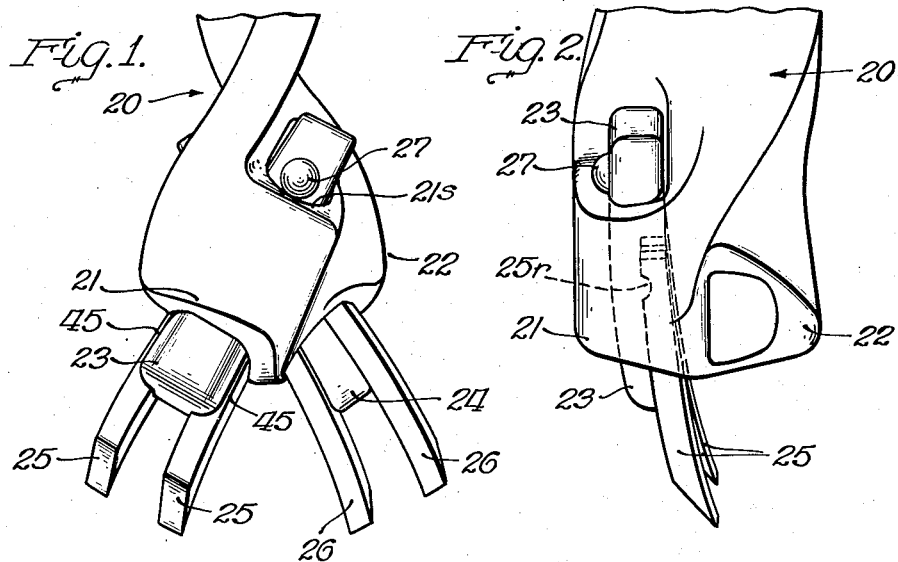
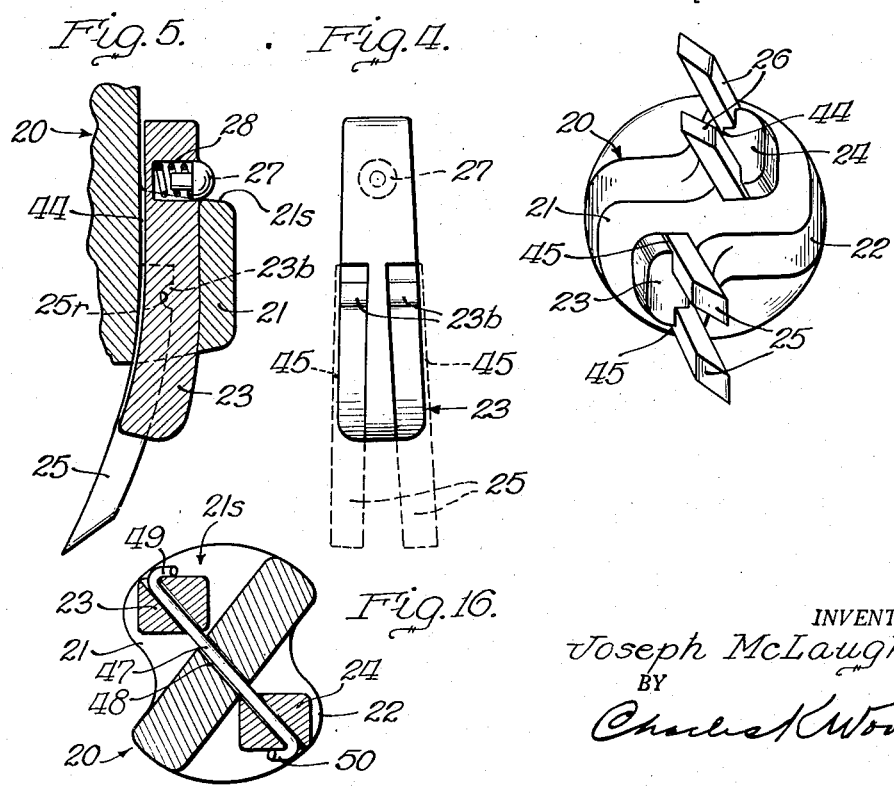
INVENTOR.
Joseph McLaughlin
BY
Charles K Woodin
Agent June 6, 1950　　　　J. McLAUGHLIN　　　　2,510,751
AUGER BIT HEAD
Filed April 8, 1944　　　　　　　　　　2 Sheets-Sheet 2
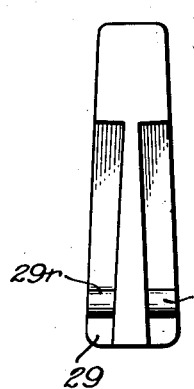
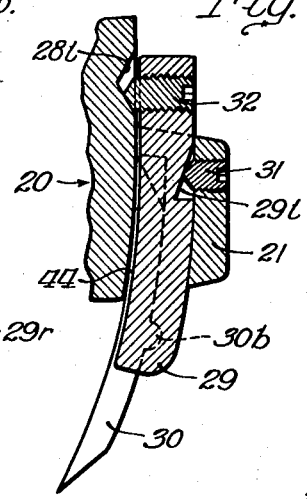
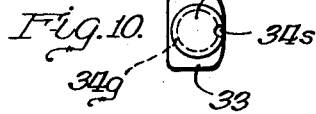
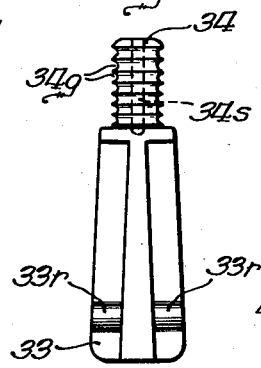
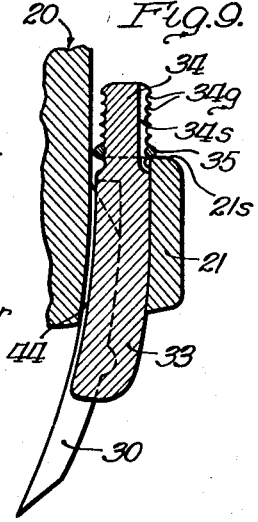
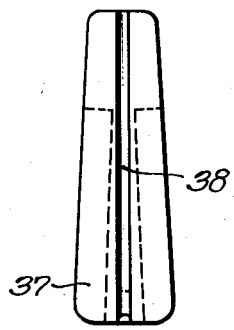
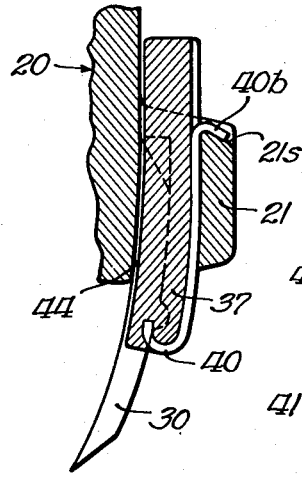
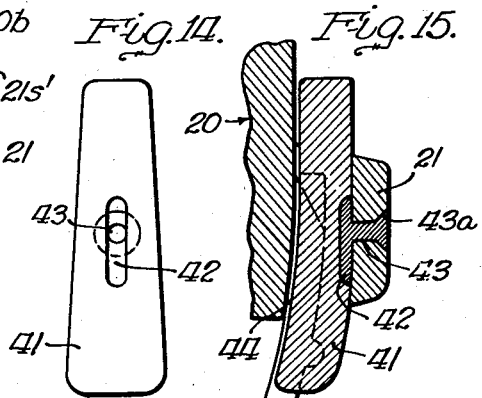
INVENTOR.
Joseph McLaughlin
BY
Charles K. Woodin
Agent
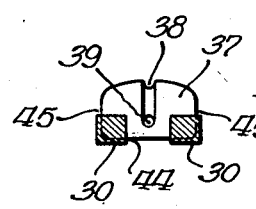

Patented June 6, 1950

2,510,751

UNITED STATES PATENT OFFICE 2,510,751

AUGER BIT HEAD

Joseph McLaughlin, Joliet, Ill.

Application April 8, 1944, Serial No. 530,196

1 Claim. (Cl. 255—69)

This invention relates to auger bit heads and particularly to the type of rotary auger bit head used for drilling in clay, coal and the like. As is well understood in the art, a bit head is securely attached to the auger screw by welding or any other suitable means, and into this head are secured removable tool bits of heat treated steel which actually do the cutting of the hole while the auger screw merely removes the cut material. The old and common problem in bit heads of this type is to positively fix the tool bits in the head, because it is frequently necessary to replace the dulled bits with sharpened ones. Although this problem has received considerable attention in the art, a completely satisfactory solution has been elusive and drilling operations are often seriously handicapped by losing drill bits in the drilled hole, resulting in tedious and expensive delays.

The particular object of the present invention is to provide an improved type of drill bit head wherein the bits are securely but removably fixed in the head.

Another object is to provide an improved type of drill bit head wherein the bits are securely held in the head by wedges interlocked with the bits, said wedges being secured to the head by additional lock means.

A further object is to provide in a wedge interlocked with the drill bit, additional lock means which is adjustable for various wedged positions.

And a still further object is to provide an additional interlock means for a wedge interlocked with a drill bit wherein the additional lock means acts to more tightly fix the wedge bit assembly in the head.

Other objects and benefits will be disclosed in the following descriptions and drawings in which:

Fig. 1 is a front elevation view of my improved auger bit head complete;

Fig. 2 is a side elevation view of the head shown in Fig. 1 with one wedge and bit assembly removed; and Fig. 3 is an end plan view thereof.

Fig. 4 is a bottom plan view of the bit wedge shown in Figs. 1 to 3; and

Fig. 5 is a broken side elevation view of the wedge shown in Fig. 4 as it would appear on a center section line mounted in the head to show the spring ball locking mechanism as will later be explained.

Fig. 6 is a bottom plan view of an optional form of wedge; and

Fig. 7 is a broken side elevation view of the wedge shown in Fig. 6 as it would appear on a center section line mounted in the head to show set screw locking means as will later be explained.

Fig. 8 is another bottom plan view of an optional form of wedge which uses a spring ring locking means;

Fig. 9 is a broken side elevation view of the wedge shown in Fig. 8 as it would appear on the center section line mounted in the head; and Fig. 10 is an end plan view of the wedge shown in Figs. 8 and 9.

Fig. 11 is a top plan view of another form of wedge which utilizes a hook wire to retain the wedge in position;

Fig. 12 is a broken side elevation view of the wedge shown in Fig. 11 as it would appear on a center section line showing the wedge in Fig. 11 held in position in the head;

Fig. 13 is an end elevation view of the wedge shown in Figs. 11 and 12 showing the wire groove therein;

Fig. 14 is another form of wedge which utilizes a Babbitt locking means;

Fig. 15 is a side elevation view of the wedge shown in Fig. 14 as it would appear on a center section line with the wedge held in position by a Babbitt lock; and Fig. 16 illustrates the use of a wire passing through the wedges and bit head to hold the wedges in place.

Now referring to the drawings, and at the outset to Figs. 1, 2 and 3, I show a conventional form of auger bit head 20 having two bit bosses 21 and 22 at the bottom thereof. A pair of tool bits 25 are held in the boss 21 by a wedge 23 and the assembly of the bits and wedge are retained in the boss 21 by a spring ball retaining device 27. Similarly the other pair of tool bits 26 are held in the boss 22 by a wedge 24 as shown.

Now referring to Figs. 4 and 5 it will be observed that in the bottom of the bit recesses in the wedge 23 are two semi-circular bosses 23b. These bosses fit in semi-circular recesses 25r in the tool bits 25 and when this assembly is inserted in the boss 21 the bits 25 are secured to the wedge 23 in such a manner as to make the removal of the bits 25 impossible without removing the wedge 23 from the hole in the boss 21. Thus, when the assembly of the bits and the wedge are inserted in the boss 21, they are held together as a unit.

Now referring to Fig. 5 it will be observed that the detent ball 27 is urged upwardly by a spring 28 and that when the detent passes the shoulder 21s of the boss 21 the ball securely locks the assembly of the wedge and bits in the boss 21 and they can not be removed without depressing the detent ball 27. Further, it will be appreciated that as the wedge 23 is driven further into the boss 21, a considerable amount of locking latitude is afforded by the semi-spherical ball 27, in fact for a distance of practically one-half its diameter. It will be appreciated that this wedging action is automatic and therefore, when the wedge is driven into the boss, the locking action will effectively take place.

Now referring to Figs. 6 and 7, I show an optional form of wedge wherein a semi-spherical depression is made in the bottom of the recesses, and further that this depression is made at a point substantially adjacent the center of the bit. Thus, the bits may be reversed to supply a new sharp set of cutting edges with the same bits. With this construction, I provide a semi-circular boss on the tool bits to fit in the semi-circular recesses in the wedge, and with this construction effect the interlock between the two bits as previously described in the structure shown in Figs. 4 and 5. This construction will be well understood by referring to Figs. 6 and 7 wherein the optional form of wedge 29 has semi-circular recesses 29r in the bottom of the bit recesses and the bits 30 have semi-circular bosses 30b to fit in these recesses. I now lock the assembly of the wedge and bits into the boss 21 by means of a hollow head set screw 31 in the boss 21 abutting against the incline 29l of a notch in the wedge 29 to effectively lock the wedge 29 in position. Further, it will be appreciated that the inclined bottom 29l, combined with the tapered point of the set screw 31 will have the effect of tightening the wedge 29 in the boss 21. Similarly, a hollow head set screw 32 in the wedge 29, forced against the slanting bottom of a locking hole 28l will effectively lock the wedge and bit assembly in the boss 21. Although I have shown two set screws 31 and 32 to effect this locking action, it will be appreciated that effective results may be obtained with a single set screw in either of the two positions as shown.

Now referring to Figs. 8, 9 and 10 the wedge 33 is exactly similar to that shown and described for the wedge 29 in Figs. 6 and 7 having the dual recesses 33r for holding the bits in exactly the same manner as described. However, in order to hold the wedge 33 in position in the boss 21 I provide a round extension 34 on the upper end. This round extension 34 is covered with concentric grooves 34g to take a conventional snap ring 35 as shown in Fig. 9. A longitudinal groove 34s provides means to move the ring along until it abuts the shoulder 21s of the boss 21. It will be obvious that when the snap ring 35 is in this position, the wedge 33 is securely locked in the boss 21, and can only be removed by removing the snap ring 35 which is done in a conventional manner by a pointed instrument in the groove 34s.

Now referring to Figs. 11, 12 and 13, I show another form of wedge 37 having a longitudinal wire groove 38 in the center thereof and a hole 39 in its end. The hole and central groove are connected to provide space for a hook wire 40 to be inserted therein. When the wedge 37 is driven in position in the boss 21, the wire 40 is bent downwardly at 40b into a tapered slot 21s' in the boss 21 to effectively lock the wedge in position. The wire 40 being almost completely embedded in the structure, is not liable to disarrangement and effectively locks the wedge in position.

Now referring to Figs. 14 and 15, I show another type of wedge 41 having a central key groove 42 in its outer face. This key groove connects with a hole 43 in the boss 21 and provides space for a melted Babbitt key which is poured in position. I use a low melting point Babbitt and therefore, when it is necessary to remove the wedge 41, a blow torch put on the boss 21 over the funnel 43a will quickly remove the Babbitt for removal of the wedge and replacement of the bits.

Now again referring to Fig. 13, it will be noted that the bits 30 provide the only bottom and side contact with the wedge openings in the boss 21— the arrangement providing gaps 44 and 45 between the wedge 37. The rounded top of the wedge 37 in a similarly formed opening in the boss thus provides a structure wherein the wedging action definitely acts to force the bit 30 into firm gripping contact with the boss 21. This securely fixes the bits and prevents wobble that loosens keys in service. By referring to Figs. 3, 5, 7, 10, 12 and 15 it will be noted that these gaps 44 and 45 are included in all my optional structures.

Fig. 16 illustrates the use of a wire 47 passing through openings in wedges 23—24, and through a substantially aligned opening 48 in bit head 20, with the ends 49 and 50 of wire 47 bent over as shown. In this construction, wire 47 locks the wedges by being disposed adjacent shoulder 21s on boss 21 and also the analogous shoulder on boss 22. Thus the wire 47 serves as a detent means to hold the wedges in place.

From the foregoing descriptions, it will be appreciated that I have provided an improved drill bit head structure wherein the bits are securely held in operating position by means of a wedge interlocked with the teeth. I have further provided additional lock means to fix the interlocked bits and wedges assemblies in effective operating position while providing means to remove the assemblies for replacement and repairs.

Having thus described my invention, I now claim as new:

In an auger bit head, tool bit bosses each having tapered tool receiving openings extending therethrough, bit and wedge assemblies including bottom edge recesses in the wedges mounting the bits below and sidewise of the wedges, interlocking key means between the wedges and bits preventing relative longitudinal movement of the assemblies, each of said wedge assemblies comprising a wedge and straight sided teeth combined to present tapered external contours coacting with their respective tapered boss opening to cause said interlocking key means to rest in positively locked position substantially centrally within the depth of said tapered boss, said wedges each having an extension thereon adapted for projecting outwardly from the upper edge of the associated boss opening, and automatic spring detent means carried by the extensions of said wedges and coacting with the upper surfaces of said bosses to lock the wedges in fixed relation within the bit head openings against longitudinal withdrawal movement and to position said interlocking key means in positive operative locked relation and nested deeply within said boss openings.

JOSEPH McLAUGHLIN.

REFERENCES CITED

The following references are of record in the file of this patent:

UNITED STATES PATENTS

| Number | Name | Date |
|---|---|---|
| 1,592,586 | Meredith | July 27, 1926 |
| 1,738,382 | McCullough et al. | Dec. 3, 1929 |
| 1,797,776 | Jacobi | Mar. 24, 1931 |
| 1,974,117 | McLaughlin | Sept. 18, 1934 |
| 1,983,798 | Hardsocg | Dec. 11, 1934 |
| 1,997,887 | Prior | Apr. 16, 1935 |
| 2,010,509 | Cook | Aug. 6, 1935 |
| 2,109,613 | Cook | Mar. 1, 1938 |
| 2,114,799 | McGlaughlin | Apr. 29, 1938 |
| 2,237,133 | Cook | Apr. 1, 1941 |
| 2,289,935 | Rufus | July 14, 1942 |